United States Patent [19]
Fletcher et al.

[11] 3,746,998
[45] July 17, 1973

[54] AUTOMATIC CARRIER ACQUISITION SYSTEM

[76] Inventors: James C. Fletcher, Administrator of the National Aeronautics and Space Administration with respect to an invention of; Robert C. Bunce, Pasadena, Calif.

[22] Filed: Dec. 13, 1971

[21] Appl. No.: 207,211

[52] U.S. Cl. ................. 325/420, 325/422, 329/120
[51] Int. Cl. ............................................. H04b 1/26
[58] Field of Search ...................... 325/63, 420–424, 325/329, 330, 335, 418, 419, 474; 329/50, 122, 123, 124, 125

[56] References Cited
UNITED STATES PATENTS
3,358,234  12/1967  Stover ............................. 325/329 X
2,837,646  6/1958  Campbell ............................ 325/470

Primary Examiner—Benedict V. Safourek
Attorney—Monte F. Mott, John B. Manning and Paul F. McCaul

[57] ABSTRACT

An automatic carrier acquisition system for a phase-locked loop (PLL) receiver is disclosed. It includes a local oscillator, which sweeps the receiver to tune across the carrier frequency uncertainty range until the carrier crosses the receiver IF reference. Such crossing is detected by an automatic acquisition detector. It receives the IF signal from the receiver as well as the IF reference. It includes a pair of multipliers which multiply the IF signal with the IF reference in phase and in quadrature. The outputs of the multipliers are filtered through bandpass filters and power detected. The output of the power detector has a signal DC component which is optimized with respect to the noise DC level by the selection of the time constants of the filters as a function of the sweep rate of the local oscillator. The power detector output passes through another filter, whose time constant is chosen to optimize the peak of a pulse produced around zero beat with respect to the root-mean-square (RMS) of the noise variations. When the amplitude of this pulse is not less than a selected amplitude, an acquisition trigger at zero beat pulse is produced to stop the sweep and close the PLL, in which the local oscillator serves as the voltage controlled oscillator of the loop.

11 Claims, 3 Drawing Figures

INVENTOR.
ROBERT C. BUNCE

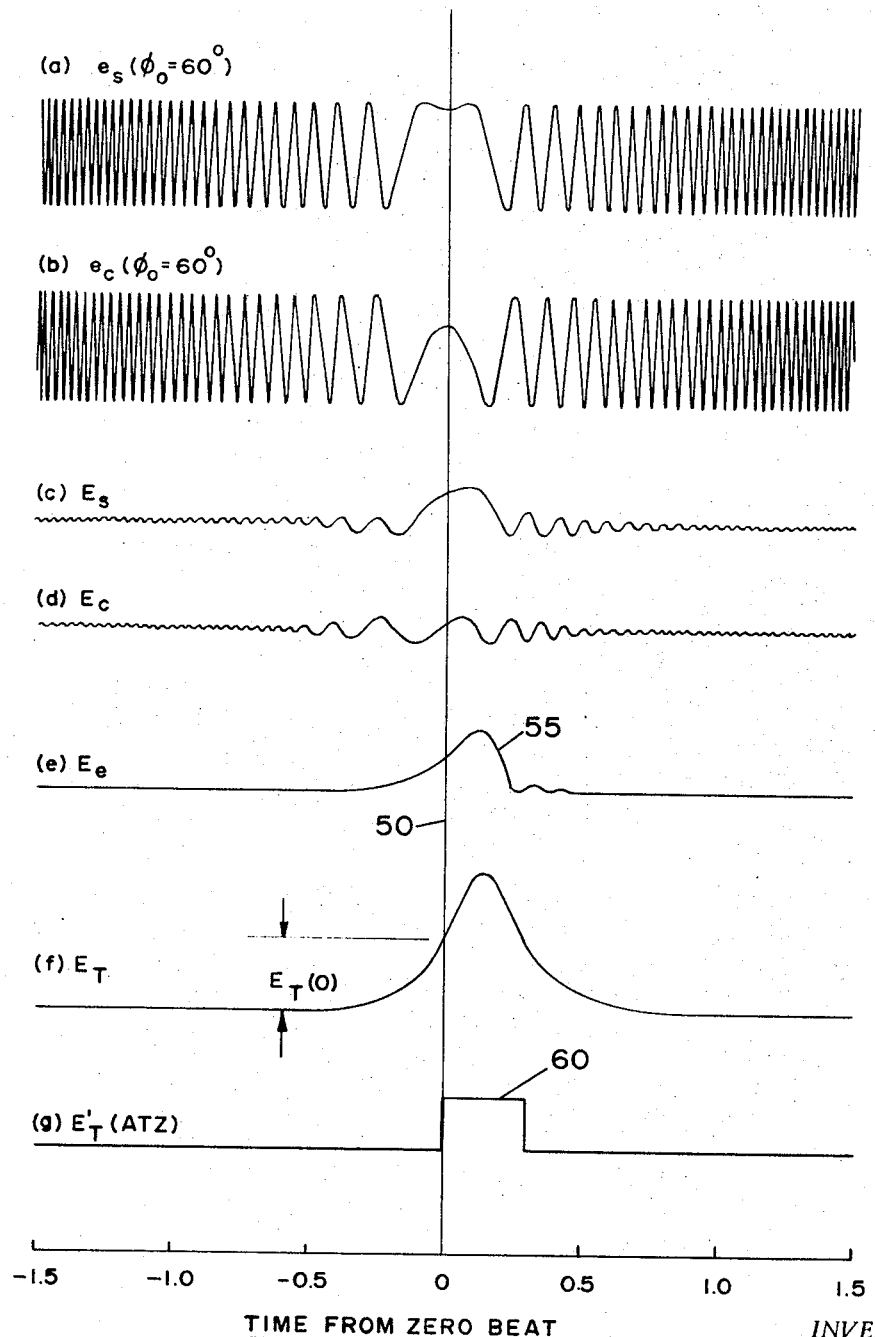

AUTOMATIC CARRIER ACQUISITION SYSTEM

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

The present invention is generally directed to a communication system and, more particularly, to an improved dual mode automatic carrier acquisition system.

2. Description of the Prior Art

The use of a phase locked loop (PLL) in a communication receiver to phase lock onto an unknown carrier frequency, located within the receiver's bandpass, is well known. The problems of obtaining phase lock under poor signal-to-noise ratio (SNR) conditions are also well appreciated. The time required to obtain such phase lock increases as the SNR decreases. Various techniques and systems have been proposed to reduce the acquisition time and the acquisition accuracy. The prior art includes a system which operates in an open loop mode until a DC signal of a sufficient level is produced, which causes the system to switch to a closed loop mode. This system is quite complex, requiring two different sweep rates of a local oscillator. Also, it is primarily designed for operation under strong signal conditions and is not optimized for severe noise conditions, such as are present in deep space communications. Also, it is subject to error since it is not triggered at precise instances, defined by the unknown carrier frequency, the receiver's IF reference frequency and the receiver's sweep frequency, provided by its local oscillator. Thus, a need exists for a new improved automatic carrier acquisition system, particularly one which is designed to operate under low SNR conditions and one which is capable of achieving phase lock in a minimum of time.

OBJECTS AND SUMMARY OF THE INVENTION

It is a primary object of the present invention to provide a new improved automatic carrier acquisition system.

Another object of the present invention is to provide an automatic carrier acquisition system capable of providing phase lock under adverse SNR conditions.

A further object of the present invention is to provide an automatic carrier acquisition system capable of providing phase lock at a minimum of time under poor SNR conditions.

These and other objects of the invention are achieved by incorporating in a communication receiver a carrier acquisition system which is operable in an open loop mode followed by a closed loop mode. The system includes a programmable local oscillator (PLO) which is capable of providing a linear frequency sweep. In the open loop mode, hereafter also referred to as the acquisition mode, the PLO sweeps the receiver, tuning across the frequency uncertainty range until the carrier crosses the IF reference frequency. This crossing is detected by a novel automatic acquisition detector. When the crossing is detected the detector provides an acquisition trigger at zero beat (ATZ) signal, which is supplied to the PLO, stopping the frequency sweep. Also, at this time, the system is switched to the closed loop mode. The loop is closed and thereafter completes final aquisition in the conventional manner, associated with a PLL.

The novel features of the invention are set forth with particularity in the appended claims. The invention will best be understood from the following description when read in conjunction with the accompanying drawings.

BRIEF DESCRIPTION OF THE DRAWINGS

FIG. 3 is a multiline waveform diagram useful in explaining the operation of the novel automatic acquisition detector.

DESCRIPTION OF THE PREFERRED EMBODIMENTS

Figure 1:
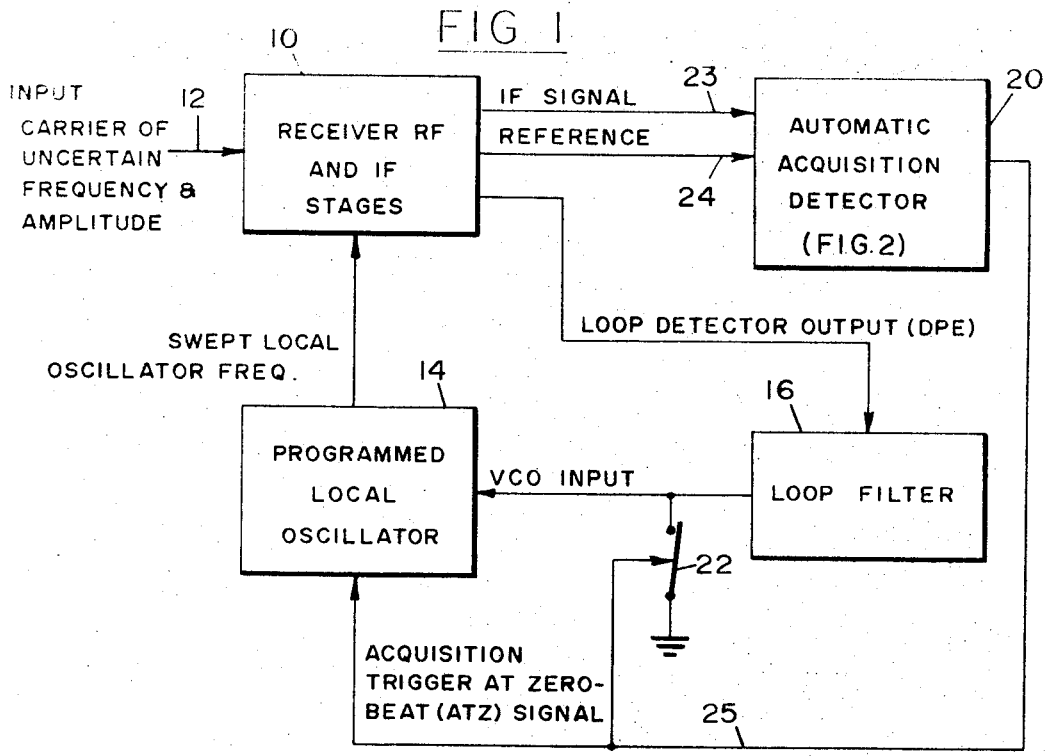
FIG. 1 is a general block diagram of the invention.

In FIG. 1 reference numeral 10 designates a receiver which is assumed to include its RF and IF stages. It receives as an input a carrier of uncertain frequency and amplitude, applied to input terminal 12, as well as, a local signal from a programmable local oscillator (PLO) 14. The system further includes the conventional loop filter 16, present in every PLL and a novel automatic acquisition detector 20.

As previously stated the system is operable first in an open loop mode and after carrier acquisition it is switched to a closed loop mode. In the open loop mode the output of filter 16 to the PLO is shorted out, such as to ground, by switch 22. In this mode the output frequency of the PLO is swept at a selected rate. The IF signal on line 23 and the IF reference on line 24 from receiver 10 are supplied to detector 20. The function of the latter is to obtain zero beat between the swept PLO frequency and that of the unknown carrier frequency, at the IF reference frequency. When this zero beat is detected an acquisition trigger at zero beat (ATZ) signal is provided by detector 20 to the PLO 14 on line 25. Upon receiving the ATZ signal, the sweep is stopped and the PLO continues to provide the frequency at the instant the ATZ signal was received. Also the system is switched to the closed loop mode in which switch 22 is opened, thereby enabling the receiver 10, loop filter 16 and the PLO 14, acting as a voltage controlled oscillator (VCO), to operate as a PLL.

Figure 2:
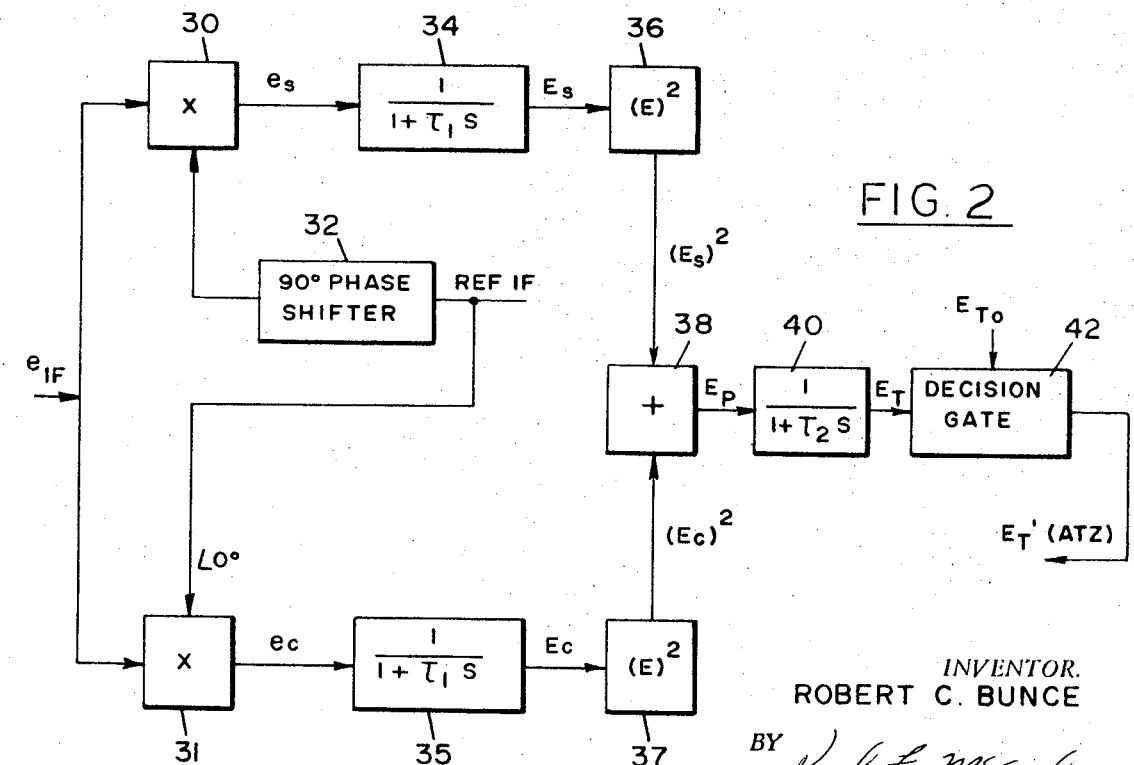
FIG. 2 is a detailed block diagram of the novel automatic acquisition detector shown in FIG. 1.

Attention is now directed to FIG. 2 which is a complete block diagram of the novel automatic acquisition detector 20, which will be described in connection with the multiline waveforms, shown in FIG. 3. The detector 20 includes a pair of multipliers 30 and 31. Multilier 30 multiplies the IF signal on line 23 with the reference IF on line 24, after the latter is phase shifted by 90° by phase shifter 32, while multiplier 31 multiplies the IF signal by the reference IF, directly without any phase shift. The outputs of the two multipliers 30 and 31, respectively designated $e_s$ and $e_c$ pass through identical narrow bandpass filters 34 and 35, respectively. These are defined by the expression $1/1+\tau_1 S$. As will be pointed out hereafter $\tau_1$ is optimized as a function of the sweep rate of PLO 14.

The outputs of the two filters 34 and 35, respectively designated $E_s$ and $E_c$, are power detected to provide an output $E_p$. This is achieved by squaring $E_s$ in unit 36 and $E_c$ in unit 37 and adding the outputs of the two squaring units in adder 38 whose output is $E_p$.

The output $E_p$ of adder 38 is supplied to another bandpass filter 40, expressed as $1/1+\tau_2 S$. As will be pointed out hereafter $\tau_2$ is optimized in terms of $\tau_1$. The output filter 40, designated $E_T$, is supplied to a comparator 42 which compares $E_T$ with a reference voltage designated $E_{T_0}$. The comparator's output, which is designed $E_T'$ is of either of two binary levels, often referred to as 0 or 1 or false or true, respectively. In the present embodiment $E_T'$ is false as long as $E_T < E_{T_0}$ and is true whenever $E_T \geq E_{T_0}$. When $E_T'$ is true it represents the acquisition at zero beat (AZT) signal, herebefore referred to, which when received by PLO 14 stops the sweep of the latter and closes the PLL, by opening switch 22.

The operation of detector 20 will now be summarized in connection with FIG. 3. Therein on lines a and b are diagrammed the outputs $e_s$ and $e_c$ of multipliers 30 and 31 respectively for an arbitrary phase error difference ($\phi$) of 60°. As the PLO 14 sweeps across the uncertain carrier frequency the IF signal frequency varies from values above the IF reference to values below the latter frequency when the IF signal frequency is the same as the IF reference frequency it represents zero beat.

At zero beat, represented in FIG. 3 by line 50, $e_s$ and/or $e_c$ have DC components of unknown amplitudes and polarities. By passing $e_s$ and $e_c$ through bandpass filters 34 and 35, their signal-to-noise ratios are altered so the DC component of $E_p$ is maximized even though the polarities of $E_s$ and $E_c$ are not known. The outputs $E_s$ and $E_c$ of filters 34 and 35 respectively, are shown on lines c and d. By power detecting the output $E_s$ and $E_c$ the output of the power detector, represented by $E_p$ on line e is a pulse 55 about zero beat which is always of the same polarity, shown as positive in FIG. 3. The polarity of pulse 55 is always the same irrespective of the phase error difference, $\phi$, and the DC SNR is maximum.

The waveform shown in line e is actually a simplification. In practice noise which has a DC component rides on this waveform. It has been discovered that by proper selection of $\tau_1$ of filters 34 and 35 with respect to sweep rate the signal D.C. component of $E_p$ with respect to the noise D.C. component can be optimized. Actually the noise out of adder 38 fluctuates in amplitude never falling below 0 volts. In order to optimize the peak amplitude of pulse 55 with respect to the RMS of the noise, the output $E_p$ is passed through the bandpass filter 40. The $\tau_2$ of this filter is chosen so as to optimize the pulse 55 with respect to the noise power. If such optimization is not performed, a possibility exists that some noise may have peak amplitudes equal or greater than $E_{T_0}$ in which case the comparator will produce an ATZ signal in response to a noise pulse rather than in response to the pulse 55 at zero beat. Thus such optimization insures that the ratio of the signal D.C. component to the noise RMS component is a maximum.

From the foregoing it should thus be appreciated that in the present invention detection occurs within 180° zero beat. Carrier acquisition is achieved by using the PLO frequency to sweep the receiver to tune across the carrier frequency uncertainty until zero beat is detected. It occurs when the carrier, translated to be within the last IF band, is equal to the IF reference frequency. At this instant, the detector generates a binary change-of-state, represented by the true pulse 60 (see line g in FIG. 3), which has been defined as the ATZ signal. It is supplied to the PLO to stop the frequency sweep and close the PLL. Thereafter the PLL completes acquisition automatically in the conventional manner.

As explained zero beat is detected by multiplying the IF signal with the IF refernce in phase and at 90° phase shift and thereafter filtering the outputs $e_s$ and $e_c$ of the two multipliers.

After filtering the outputs of the two filters 34 and 35 are power detected providing an output $E_p$, which is always of the same polarity.

Filtering is done to maximize the signal D.C. component of $E_p$ with respect to noise D.C. component. It has been discovered that optimum results are achieved when $\tau_1$ is substantially equal to $$1/\sqrt{2\pi f}$$

where $f$ is the rate of change of the frequency sweep in cycles per second and $\tau_1$ is in seconds.

Noise appears on $E_p$ as an average D.C. value with residual variations around it. In order to filter the noise variations and reduce the probability that one of them might exceed the trigger level ($E_{T_0}$), the power detector output $E_p$ is filtered in filter 40. This filter has the effect of suppressing the amplitude of $E_p$, i.e., pulse 55 (see FIG. 3). It has been discovered however that the peak-pulse value to noise variance ratio depends on the relationship between $\tau_2$ and $\tau_1$. It is optimum when $\tau_2 = 1.68\tau_1$ although satisfactory results are achieved with a $\tau_2$ which is one to four times $\tau_1$.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. In a communication system receiver of the type including a receiving unit which receives a carrier frequency and a variable frequency from a local oscillator, and which includes a source of reference intermediate frequency definable as an IF reference, said receiving unit providing an IF signal which is a function of the difference between the carrier and local oscillator frequencies, an arrangement for detecting zero beat representing the time when the difference between the carrier and local oscilllator frequencies is substantially equal to said IF reference, the arrangement comprising:

a local oscillator for providing a frequency which varies at a preselected sweep rate;

a first multiplier for multiplying said IF signal by said IF reference;

phase shift means for phase shifting said IF reference by 90°;

a second multiplier for multiplying said IF signal by the IF reference shifted by 90°;

first and second filter means for filtering the outputs of said first and second multipliers, respectively;

first and second squaring means for squaring the outputs of said first and second filter means, respectively;

summing means for providing an output signal which is the sum of the outputs of said first and second squaring means;

third filter means for filtering the output signal of said summing means;

output means responsive to the output of said third filter means for providing an output signal indicating zero beat when the amplitude of the output of said third filter means is not less than a preselected amplitude; and means for applying the output signal of said output means indicating zero beat to said local oscillator to terminate the frequency sweep thereof.

2. The arrangement as recited in claim 1 wherin each of said first and second filter means is characterized by a time constant definable as $\tau_1$ which is a function of the sweep rate of said local oscillator, and said third filter means is characterized by a time constant, definable as $\tau_2$, which is related to $\tau_1$.

3. In a communication system receiver of the type which receives a carrier frequency comprising:

a variable frequency local oscillator providing an output frequency which is variable at a preselected sweep rate;

a receiving unit, including a source of an intermediate frequency definable as an IF reference and responsive to the output frequency of said oscillator and said carrier frequency for providing an IF signal whose frequency is a function of the difference between the oscillator's and carrier frequencies;

a first multiplier for providing an output as a function of the IF signal and said IF reference;

phase shifting means for phase shifting said IF reference by 90°;

a second multiplier for providing an output as a function of the IF signal and said IF reference shifted by 90°;

first and second filters for filtering the outputs of said first and second multipliers respectively, each of said filters being definable by the transformation $1/1 + \tau_1 S$ wherein $\tau_1$ is a time constant which is a function of the sweep rate;

power detection means for providing an output which is the sum of the squared outputs of said first and second filters; and output means for providing an output signal whenever the amplitude of the output of said power detection means is not less than a preselected amplitude.

4. The arrangement as recited in claim 3 further including means for applying the output signal of said output means to said oscillator to terminate the frequency sweep thereof.

5. The arrangement as recited in claim 3 wherein $\tau_1$ is substantially equal to $$1/\sqrt{2\pi f}$$

wherein $f$ is the sweep rate in cycle per second.

6. The arrangement as recited in claim 3 wherein said output means include a third filter to which the output of said power detection means is supplied and comparing means for providing said output signal whenever the amplitude of the output of said third filter is not less than said selected amplitude, said third filter being characterized by the transformation $1/1 + \tau_2 S$, wherein $\tau_2$ is a time constant.

7. The arrangement as recited in claim 6 wherein the time constant of said third filter is definable as $\tau_2$ which is in the range of one to four times $\tau_1$.

8. The arrangement as recited in claim 7 wherein $\tau_1$ is substantially equal to $$1/\sqrt{2\pi f}$$

wherein $f$ is the sweep rate in cycles per second.

9. The arrangement as recited in claim 8 further including means for terminating the sweep of said oscillator when said output means provide said output signal.

10. The arrangement as recited in claim 8 wherein $\tau_2$ is substantially equal to $1.68\tau_1$.

11. The arrangement as recited in claim 10 further including means for terminating the sweep of said oscillator when said output means provide said output signal.

* * * * *